A. MASS.
MOTOR POWER TRANSMISSION.
APPLICATION FILED NOV. 20, 1915.

1,215,177.

Patented Feb. 6, 1917.

WITNESSES

INVENTOR
Adolph Mass
BY
ATTORNEYS

UNITED STATES PATENT OFFICE.

ADOLPH MASS, OF NEWARK, NEW JERSEY.

MOTOR-POWER TRANSMISSION.

1,215,177.

Specification of Letters Patent.

Patented Feb. 6, 1917.

Application filed November 20, 1915. Serial No. 62,582.

*To all whom it may concern:*

Be it known that I, ADOLPH MASS, a subject of the Emperor of Germany, and a resident of Newark, in the county of Essex and State of New Jersey, have invented a new and Improved Motor-Power Transmission, of which the following is a full, clear, and exact description.

Among the principal objects which the present invention has in view are: to provide means for transmitting power from a wabble disk motor; to avoid the employ of packed bearings in said transmission; and to simplify the construction and lessen the cost of manufacture of a motor having the transmission referred to.

Drawings.

Figure 1:
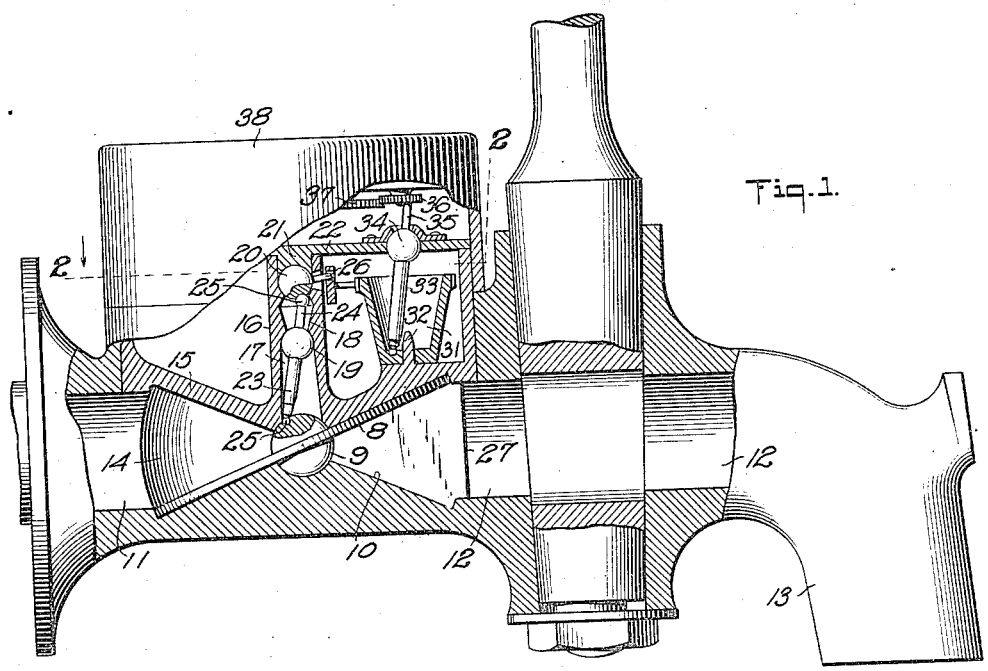
Figure 1 is a side view partly in section of a delivery faucet having a motor and meter constructed and arranged in accordance with the present invention.

Description.

As seen in the drawings, a disk 8 has at the center thereof, a bearing ball 9. A seat is formed for the said ball in the cone bottom 10 and in a chamber disposed between the inlet passage 11 and outlet passage 12, which constitute, in part, a faucet of which the nozzle 13 is a member. The chamber 14 above referred to, is covered by a top 15. The top 15 has a centrally disposed column 16, in which are formed passages 17 and 18. The lower end of the passage 17 is ground to form a seat for the ball 9.

The column 16 is internally contracted to permit the grinding of a seat at the point of division of the said passages 17 and 18 for the ball 19, which, in service, completely obstructs the communication between the passages 17 and 18. The upper end of the passage 18 is closed by a ball 20, a seat for which is formed in a projection 21 offset from the plate 22.

The balls 9, 19 and 20 are operatively connected by the short rod extensions 23 and 24, both of said extensions being rigidly or integrally mounted on the ball 19. The end of each of said extensions has a small ball 25, which is loosely seated in a cup socket formed in the balls 9 and 20, one of said sockets being concentric with the ball 20 and with the disk 8.

It is obvious that whatever water is admitted from the passage 11 to the chamber 14, has access to the passage 17. The pressure of the water introduced into the said chamber bears on the top of the disk 8 and holds the bearing ball 9 on its seat. It operates in the same manner on the ball 19, pressing upward against the said ball to force it upon its seat, and effectively closing communication between the passages 17 and 18. As the water passes through the chamber 14, the disk 8 is wabbled or progressively inclined around the circular base of the cone bottom 10.

Any tendency on the part of the disk 8 to rotate is corrected by a fin 27. The axis of the ball 9 is perpendicular to said disk. The socket in which the extension 25 rests performs a gyratory path around the vertical axis of the passages 17 and 18. The pin 26 is operatively connected with a disk. A corresponding movement is imparted to the shorter extension 24, the end of which being offset from the vertical center of the ball 20, rotates the same. The angular relation of the pin 26 to the vertical center of the ball 20, is such as to produce a gyratory action in the end of the pin when the ball 20 is rotated by the extension 24.

The pin 26 is operatively connected with a disk 28, a slot being formed therein to receive the said pin. The disk 28 is rigidly mounted on the end of a shaft 29, having a worm 30 engaging a dish wheel 31 and teeth formed at the periphery thereof, as shown best in Fig. 2 of the drawings. The wheel 31 is held centrally located by a pin 32. A socket disposed in the bottom of the wheel 31 holds the ball end of the arm 33. The arm 33 has a bearing ball 34, and a short end 35 which engages a pinion 36, being one of the members of a gear train 37 mounted in a casing 38 in a conventional manner.

It will now be seen that when the disk 28 is rotated, as in the manner above noted, the shaft 29 and the worm 30 thereon are rotated to operate the wheel 31, and through it, the arm 33 and end 35, and the gear train 37 operatively connected with said end.

It will be noted that the various moving joints are formed by means of single balls from which radiate extensions, the ends whereof are gyratory. It is obvious that the transmission members may be operated with the least possible friction, and that any lubrication that is necessary is supplied by the medium in which they are working.

Figures 2, 3, 4:
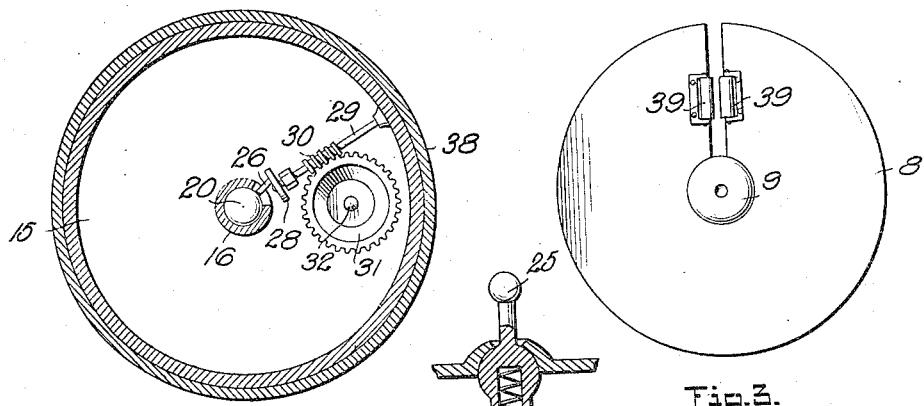
Fig. 2 is a cross section taken as on the line 2—2 in Fig. 1.
Fig. 3 is a top view of a wabble disk constructed in accordance with the present invention.
Fig. 4 is a vertical section of a modified form of transmission arm, the section being taken as on the median plane thereof.

To assist the operation of the apparatus and to avoid friction of the fin 27, the disk 8, as seen best in Fig. 3 of the drawings, is provided with rollers 39, which rollers rest against the said fin at opposite sides thereof. Any rotary pressure resulting from the action of the fluid on the disk is thereby overcome and all thrust friction is thereby absorbed.

The modified form of the transmission arm shown in Fig. 4, provides a movable end 40, which is held in engagement with a socket provided in a pivot ball, by a spring 41, located in an elongated socket in the body 42.

Claims:

1. An apparatus as characterized comprising a wabble disk having a centrally disposed bearing ball; a gear train embodying a driven shaft and connecting disk therefor; a transmission ball having a pin extended therefrom; and a transmission rod operatively connecting said transmission ball and the bearing ball of said disk, the points of engagement of said rod with said bearing ball and transmission ball being at points on the outer surface of said balls approximately ninety degrees removed from the said pin and from the plane of said disk, respectively.

2. An apparatus as characterized comprising a wabble disk having a centrally disposed bearing ball; a gear train embodying a centrally disposed shaft and connecting disk therefor; a transmission ball having a pin extended therefrom; a transmission rod operatively connecting said transmission ball and bearing ball of said disk, the points of engagement of said rod with the said bearing ball and transmission ball being at points at the outer surface of said balls approximately ninety degrees removed from the said pin and from the plane of said disk, respectively; an auxiliary bearing ball intermediate the ends of said transmission rod; and a supporting seat for said auxiliary bearing ball for relieving the pressure of said transmission rod on said transmission ball and bearing ball of said disk.

3. An apparatus as characterized comprising a wabble disk having a centrally disposed bearing ball; a gear train; and a transmission mechanism operatively connecting said disk and train, said mechanism embodying a connecting rod having intermediate the ends thereof, a bearing ball for resisting the thrust on said rod, one end of said rod being contained in a socket formed in said bearing ball in line with the axis of said disk.

ADOLPH MASS.

Witnesses:
VINCENT GUNZELMAN,
OSWALD SCHOENER.

Copies of this patent may be obtained for five cents each, by addressing the "Commissioner of Patents, Washington, D. C."